(12) United States Patent
Meier

(10) Patent No.: US 9,358,864 B2
(45) Date of Patent: Jun. 7, 2016

(54) DEVICE FOR FASTENING A BATTERY MODULE TO A BODYSHELL OF A MOTOR VEHICLE

(71) Applicant: Dr. Ing. h.c.F. Porsche Aktiengesellschaft, Stuttgart (DE)

(72) Inventor: Steffen Meier, Freudental (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 242 days.

(21) Appl. No.: 13/917,150

(22) Filed: Jun. 13, 2013

(65) Prior Publication Data
US 2013/0333967 A1 Dec. 19, 2013

(30) Foreign Application Priority Data
Jun. 14, 2012 (DE) .................. 10 2012 105 140

(51) Int. Cl.
| B60R 16/04 | (2006.01) |
| B60K 1/04 | (2006.01) |
| B60L 3/00 | (2006.01) |
| B60L 11/18 | (2006.01) |

(52) U.S. Cl.
CPC ............ *B60K 1/04* (2013.01); *B60L 3/0007* (2013.01); *B60L 3/0046* (2013.01); *B60L 11/1877* (2013.01); *B60L 11/1879* (2013.01); *B60K 2001/0416* (2013.01); *Y02T 10/705* (2013.01); *Y02T 10/7005* (2013.01)

(58) Field of Classification Search
CPC ............. B60K 1/04; B60K 6/40; B60K 6/28; B60K 2001/005; B60K 11/06; B60K 2001/0438; B60K 2001/0416; H01M 2/10; Y10S 903/903; B60L 3/0007; B60L 3/0046; B60L 11/1877; B60L 11/1879

USPC ......................................................... 180/68.5
See application file for complete search history.

(56) References Cited

U.S. PATENT DOCUMENTS

| 4,058,182 A | 11/1977 | Huber | |
| 5,555,950 A * | 9/1996 | Harada | ............... H01M 2/1083 180/232 |
| 5,585,205 A * | 12/1996 | Kohchi | ..................... B60K 1/04 180/65.1 |
| 2004/0235315 A1* | 11/2004 | Masui | ...................... B60K 1/04 439/34 |
| 2005/0040676 A1 | 2/2005 | Kikuchi | |
| 2007/0007060 A1 | 1/2007 | Ono et al. | |
| 2007/0137907 A1* | 6/2007 | Amori | ...................... B60K 1/04 180/65.1 |

(Continued)

FOREIGN PATENT DOCUMENTS

| DE | 25 22 844 | 12/1976 |
| DE | 10 2009 006 990 | 8/2010 |
| DE | 11 2009 004 862 | 11/2012 |

OTHER PUBLICATIONS

German Search Report of Feb. 27, 2013.

*Primary Examiner* — John Walters
(74) *Attorney, Agent, or Firm* — Gerald E. Herpos; Michael J. Porco; Matthew T. Hespos

(57) ABSTRACT

A device is provided for fastening a battery module (2) to a bodyshell (1) of a motor vehicle. The battery module has a battery (15) and a support (16) connected fixedly to the battery. The support (16) has an undercut (22) that interacts with an undercut (11) on the bodyshell. Such a connection can be produced in a simple manner and, moreover, is reliably secure in the event of a crash, in particular a rear crash of the motor vehicle.

13 Claims, 5 Drawing Sheets

(56) References Cited

U.S. PATENT DOCUMENTS

| | | | |
|---|---|---|---|
| 2007/0154757 A1* | 7/2007 | Okazaki | B60K 1/04 429/438 |
| 2007/0175623 A1* | 8/2007 | Park | H01M 10/625 165/202 |
| 2008/0251246 A1* | 10/2008 | Ohkuma | B60K 1/04 165/287 |
| 2009/0120703 A1* | 5/2009 | Nagata | B60K 1/04 180/68.5 |
| 2009/0166116 A1 | 7/2009 | Kiya et al. | |
| 2011/0262801 A1* | 10/2011 | Schwab | B60K 1/04 429/163 |
| 2012/0028135 A1 | 2/2012 | Ohashi | |
| 2012/0301765 A1* | 11/2012 | Loo | H01M 2/1083 429/100 |

* cited by examiner bodyshell of a motor vehicle, and particularly a device that can be made in a simple manner and that ensures a reliably secure connection in the event of a crash, such as a rear crash of the motor vehicle.

DEVICE FOR FASTENING A BATTERY MODULE TO A BODYSHELL OF A MOTOR VEHICLE

CROSS REFERENCE TO RELATED APPLICATIONS

This application claims priority under 35 USC 119 to German Patent Appl. No. 10 2012 105 140.2 filed on Jun. 14, 2012, the entire disclosure of which is incorporated herein by reference.

BACKGROUND OF THE INVENTION

1. Field of the Invention

The invention relates to a device for fastening a battery module to a bodyshell of a motor vehicle.

2. Description of the Related Art

High voltage batteries are used in motor vehicles in conjunction with a hybrid drive of a motor vehicle or a purely electrically drivable motor vehicle.

It is the object of the invention to provide a device for fastening a battery module to the bodyshell of the motor vehicle, and particularly a device that can be made in a simple manner and that ensures a reliably secure connection in the event of a crash, such as a rear crash of the motor vehicle.

SUMMARY OF THE INVENTION

The invention relates to a device for fastening a battery module to the bodyshell of a motor vehicle. The battery module has a battery, a support connected fixedly to the battery, and means for screwing the support and the bodyshell together. The support has an undercut that interacts with an undercut on the bodyshell.

The battery is relatively heavy component and is subject to high acceleration forces in the event of a crash. However, the undercuts of the support and the bodyshell interact to absorb forces acting between the support of the battery module so that the screw connection between the support and bodyshell is not damaged. Accordingly, the form-fitting connection between the undercuts brings about a significant reduction of the forces acting on the screwing points in the event of a crash.

The undercuts of the support and the bodyshell also define a stop that simplifies the alignment of the battery module during assembly of the motor vehicle.

The large mass of the battery module causes high forces to act on the screwing points of the support and the bodyshell in the event of a rear crash of the motor vehicle. The interacting undercuts on the support and the bodyshell ensure that these high forces will not cause the battery module to be torn off in a crash and penetrate from the rear region of the motor vehicle into the passenger compartment where the battery module could cause serious safety problems.

The battery preferably is a high voltage battery.

The undercuts of the support and the bodyshell preferably are positioned so that the undercut of the support contacts the undercut of the body part when the support is fastened to the bodyshell. Thus, the contact connection already exists prior to a crash, and therefore, the battery module cannot be displaced with respect to the bodyshell in the event of a crash. This arrangement also is of particular advantage for positioning the battery module with respect to the bodyshell during assembly.

Accordingly, the undercuts of the support and the bodyshell are supported on each other immediately at the onset of an impact on the rear of the motor vehicle.

The bodyshell preferably has a battery box in the rear region of the motor vehicle has for insertion of the battery. The battery is supported on the base of the battery box and is screwed to the bodyshell by the support connected fixedly to the battery.

The battery preferably is arranged in the transverse direction of the vehicle.

The bodyshell preferably has rear longitudinal members of the motor vehicle on both sides and brackets are fixedly connected to the longitudinal members. The brackets function to mount the support on both sides of the battery. The support protrudes beyond the battery at remote ends so that the connection to the rear longitudinal members can take place in a simple manner.

The support preferably has at least two undercuts, and the bodyshell has a corresponding number of undercuts that interact with the undercuts of the support. The support preferably has an undercut in the region of each bracket for interacting with an undercut of the bracket on the bodyshell.

Each bracket preferably is a forged or cast part.

The support preferably is arranged on an upper side of the battery and rests on an upper side of the brackets. In this arrangement, the battery preferably rests on a base of the battery box.

The support may be a crossmember with screwing points to the bodyshell on both sides of the battery to ensure a secure screw connection between the support and the bodyshell. Specifically, the support preferably has bores for receiving screws to define means for screwing the support and the bodyshell together. The bodyshell or the brackets also may have bores or threaded bores for the screws. Threaded bores enable each screw to be screwed directly therein, while unthreaded bores are used with nuts.

Each bracket preferably is oriented in the longitudinal extent of the motor vehicle and has front and rear rests for the support. The rear of the front rest may have the undercut the interacts with the undercut of the support.

Further features of the invention emerge from the dependent claims, the attached drawing and the description of the preferred exemplary embodiment, which is reproduced in the drawing, without being restricted to said exemplary embodiment.

DETAILED DESCRIPTION OF THE PREFERRED EMBODIMENTS

Figure 1:
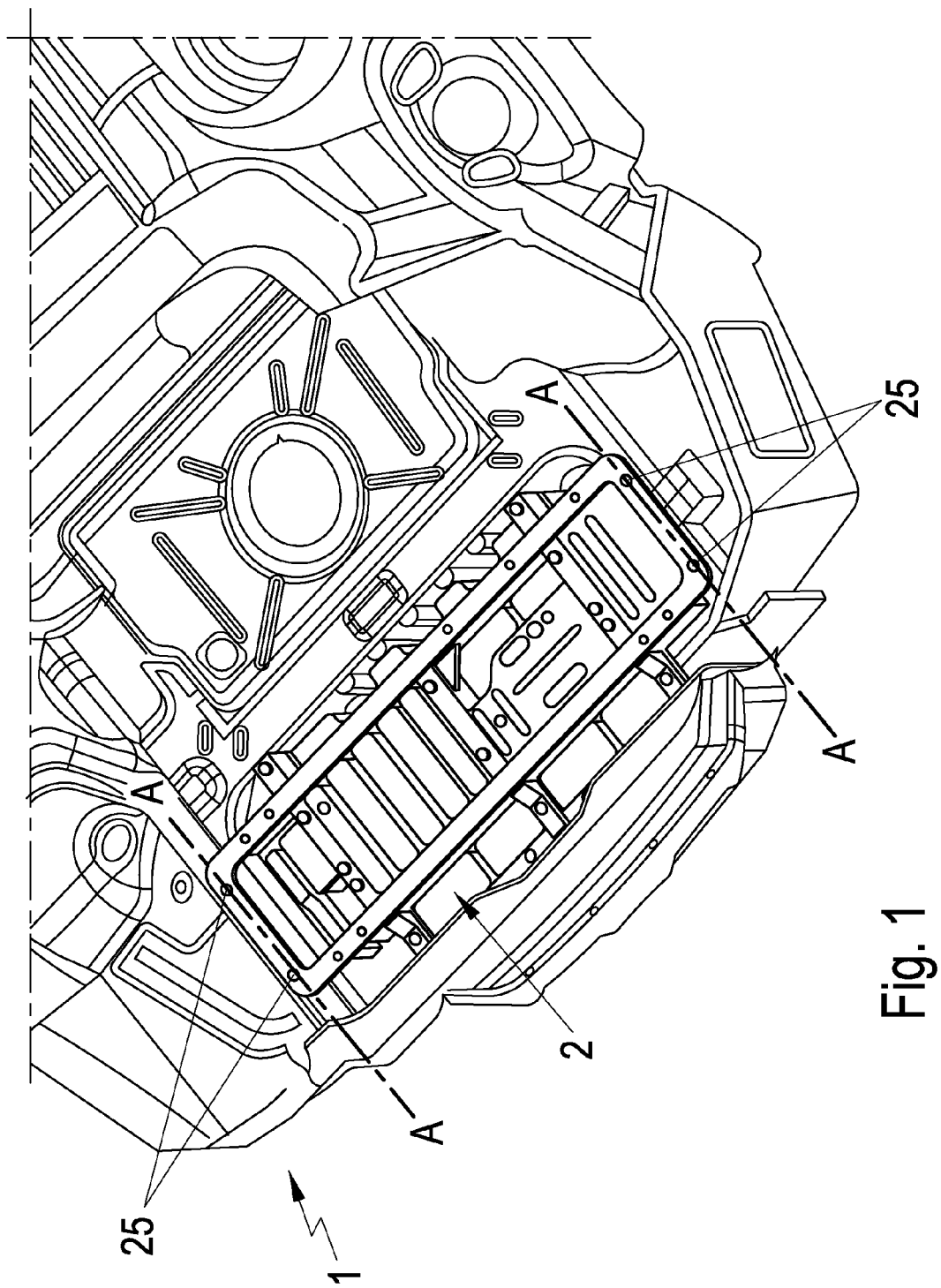
FIG. 1 is a three-dimensional illustration of a rear region of a motor vehicle, with a battery module connected to the bodyshell, as seen obliquely from above.
Figure 2:
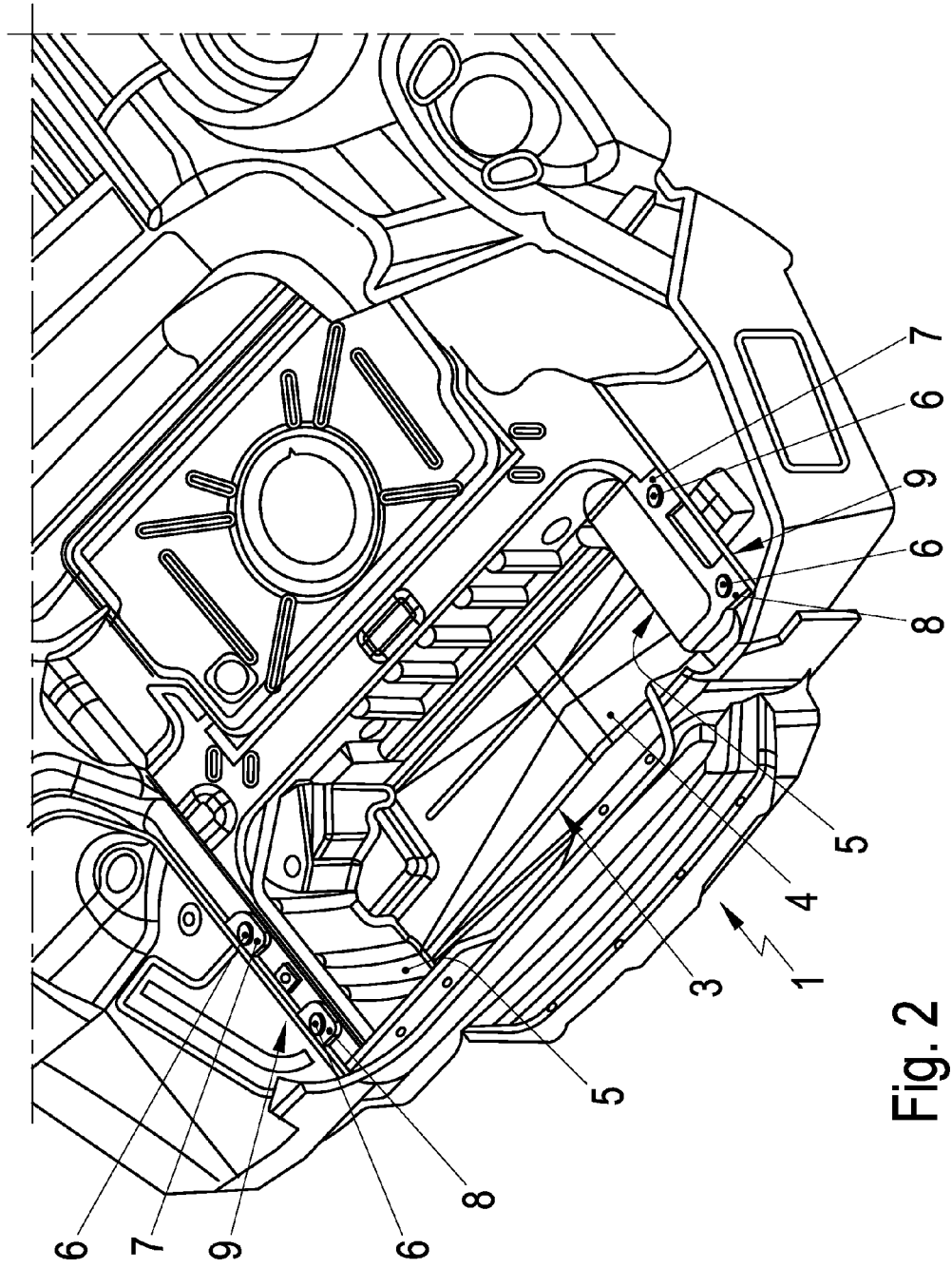
FIG. 2 shows the bodyshell of FIG. 1.

FIG. 1 shows the rear region of a bodyshell 1 and a battery module 2 fastened to the bodyshell 1. The bodyshell 1 is illustrated by itself in FIG. 2. A battery box 3 is provided in a region of the bodyshell 1 near the rear of the motor vehicle and a battery can be inserted into the battery box 3. The battery box 3 extends in the transverse direction of the motor vehicle and is illustrated as a substantially cuboidal cavity. A base 4 of the battery box 3 supports the battery. The battery box 3 has end walls 5 that run in the longitudinal direction of the motor vehicle, and the bodyshell 1 has two screwing points 6 in the region of each end wall 5 next to the battery box 3. The battery module 2 is connectable to the bodyshell 1 in the region of the screwing points 6. Two front brackets 7 and two rear brackets 8 are provided on the body shell 1 in the region of the screwing points 6 and are welded or otherwise connected to rear longitudinal members 9 that form part of the bodyshell 1. Therefore, a front bracket 7 and a rear bracket 8 are connected to each longitudinal member 9. Each bracket 7, 8 has a through hole 10 that can be a threaded bore and forms a screwing point to the battery module 2. The rear-facing side of each front bracket 7 has an undercut 11 formed by a substantially vertically oriented wall 12 of the front bracket 7. The brackets 7 and 8 have upper receiving surfaces 13 through which the holes 10 pass. The receiving surfaces 13 are arranged in a plane and function to support the battery module 2. The front and rear brackets 7 and 8 assigned to each longitudinal member 9 form a constructional unit 14.

Figure 3:
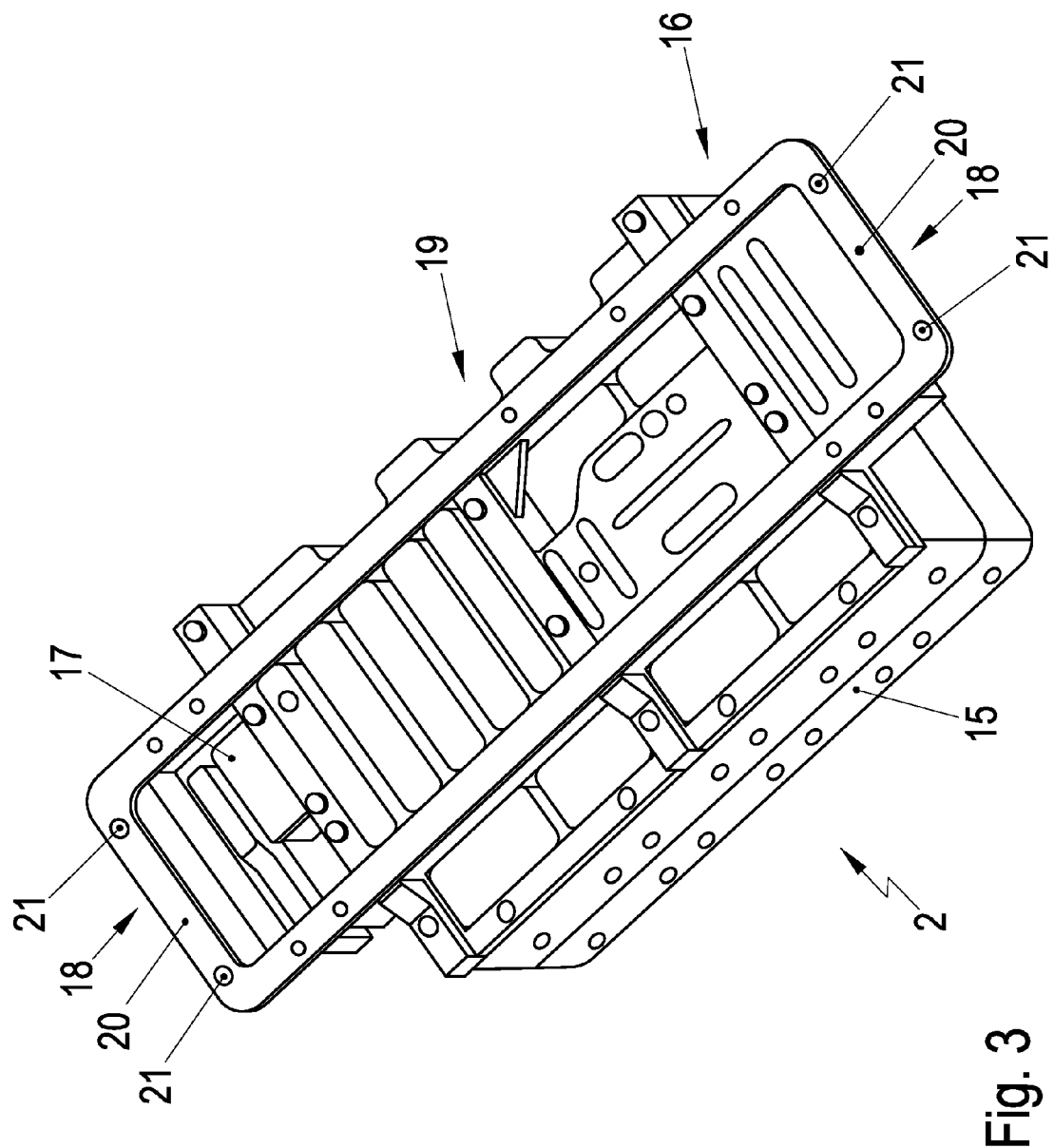
FIG. 3 shows the battery module of FIG. 1.

FIG. 3 shows the battery module 2. The battery module 2 has a high voltage battery 15 that defines part of a hybrid drive for the motor vehicle. The battery 15 has a plurality of individual batteries that are interconnected to define a substantially cuboidal body unit. The battery module 2 also has a support 16 that is made, for example, of steel and that is connected fixedly to the battery 15 The support 16 is placed onto the upper surface of the battery 15 and is connected fixedly thereto, for example by screws. A battery manager 17 is connected to an end of the battery 15. The support 16 is a crossmember arranged in the transverse direction of the bodyshell 1 and in the longitudinal direction of the battery box 3. The support 16 has remote ends 18 that protrude beyond the battery 15 and the battery manager 17. The support 16 also has an upper, substantially rectangular frame part 19. The frame part 19 has holes 21 in regions of the frame limbs 20 and facing the ends 18. The holes 21 constitute the screwing points for screwing the support 16 and the entire battery module 2 to the brackets 7, 8 and hence to the bodyshell 1.

Figure 4:
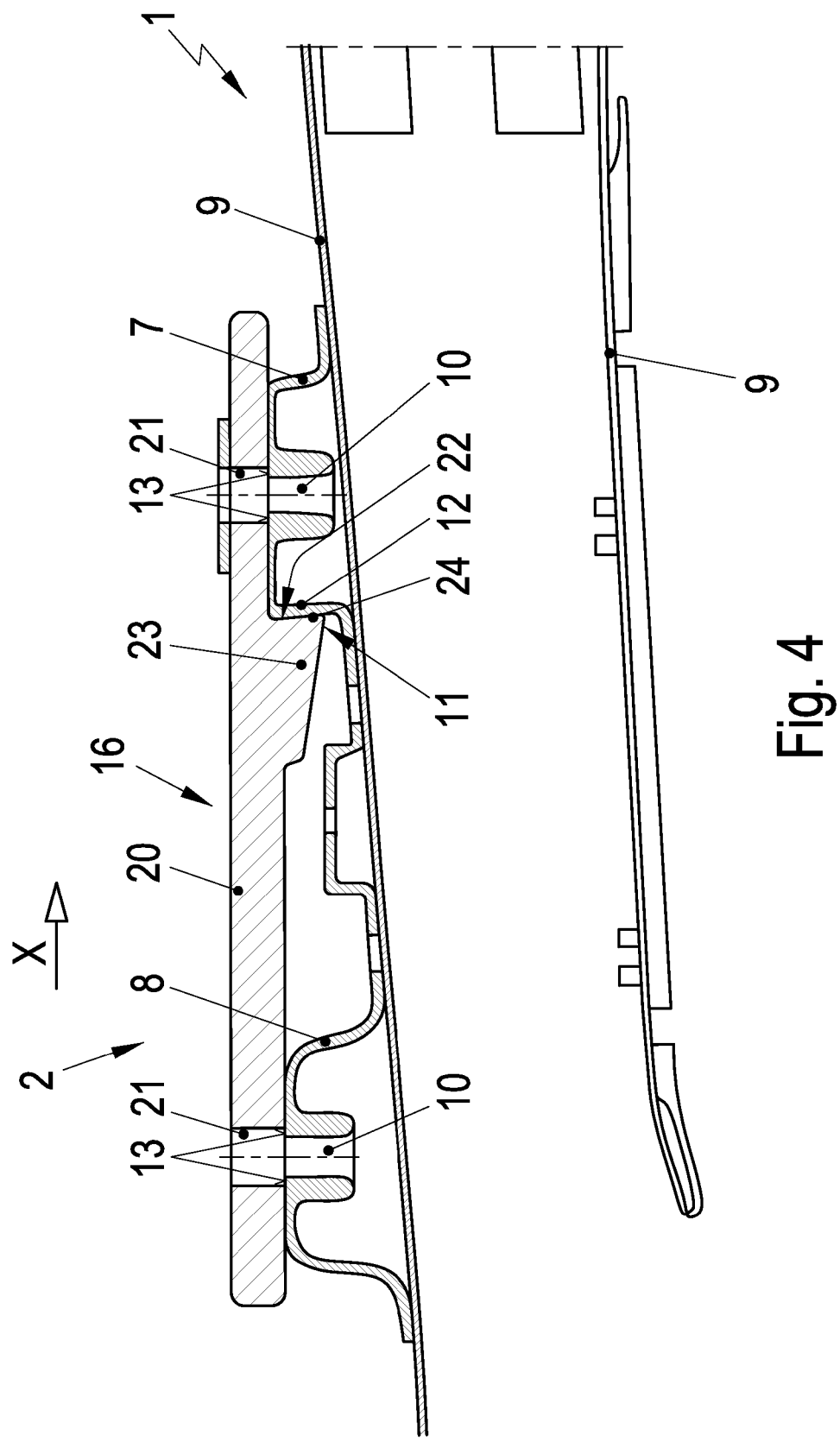
FIG. 4 is a cross section taken along line A-A of FIG. 1 and shows the arrangement of the bodyshell and the support of the battery module.
Figure 5:
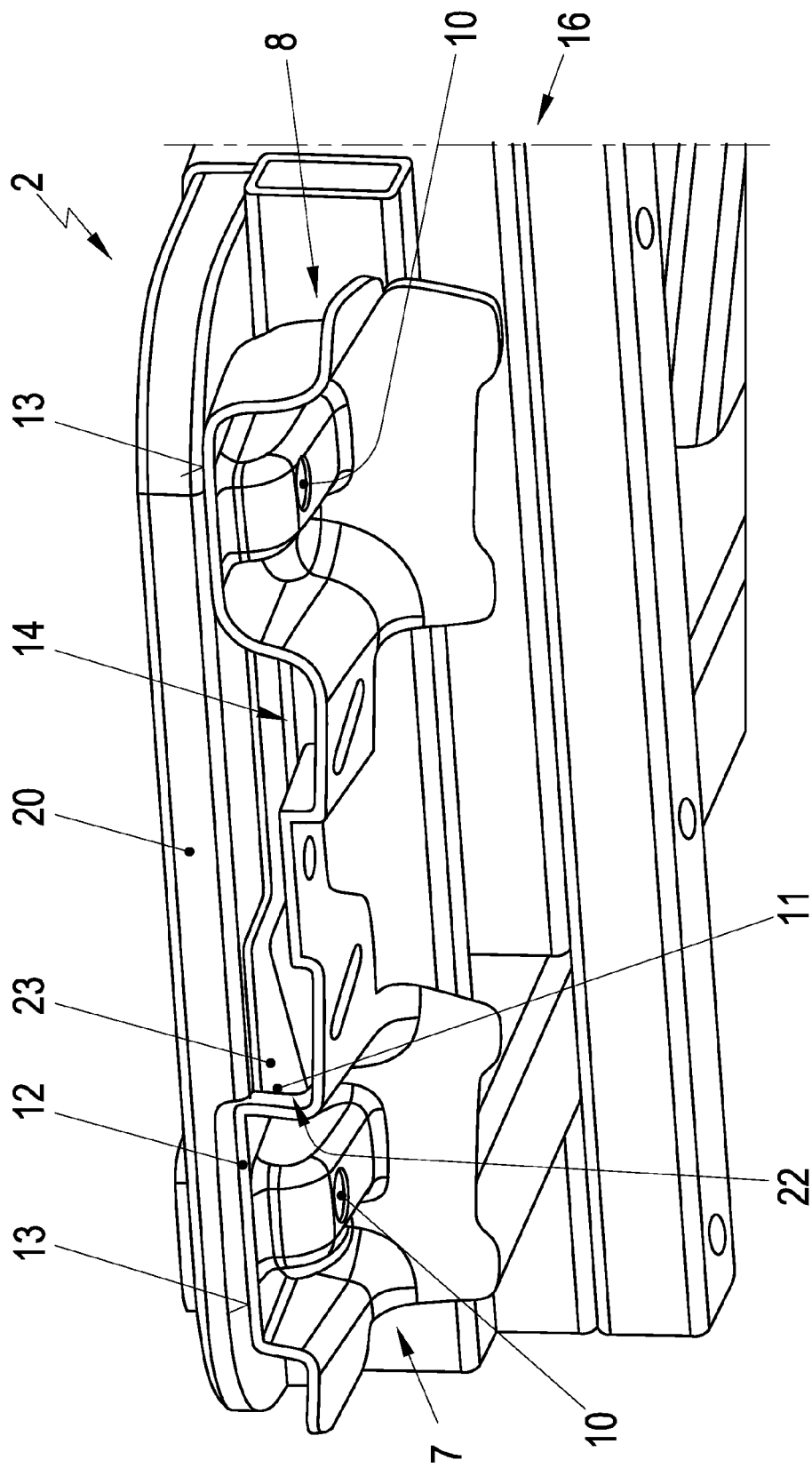
FIG. 5 is a three-dimensional illustration of the arrangement of a bracket of the bodyshell and of the support interacting with the bracket.

The lower side of the support 16 has an undercut 22 in the region of the two frame limbs 20 of the support 16 and adjacent to the front hole 21 of each frame limb 20, as shown in FIGS. 4 and 5. The undercut 22 is formed by a projection 23 on the frame limb 20. The projection 23 has a front surface 24 which, in the installed position of the support 16 and the bodyshell 1, makes contact with the wall 12 of the front bracket 7 so that a form-fitting connection is provided between the support 16 and the bodyshell 1 in the direction of the arrow x in FIG. 4.

During installation, the battery module 2 is grasped in the region of the frame limbs 20 and the battery 15 inserted into the battery box 3 from above. The dimensions are selected so that the two frame limbs 20 of the support 16 rest in a planar manner on the two front brackets 7 and the two rear brackets 8 as shown in FIGS. 4 and 5 with the battery 15 resting on the base 4 of the battery box 3. During this installation, the two projections 23 of the support 16 are inserted directly behind the two front brackets 7 and bear against the walls 12 thereof, as shown in FIGS. 4 and 5. The holes 10 and 21 are aligned with each other and four fastening screws 25 are inserted through or threaded into the holes 10. Thus, the support 16 and the entire battery module 2 are fixed to the brackets 7 and 8, and therefore to the bodyshell 1.

This fastening of the battery module 2 to the bodyshell 1 meets safety requirements in the event of a rear crash by preventing the screws 25 arranged in the region of the screwing points 6 and the holes 10 and 21 from being torn off. The interaction of the support 16 and the bodyshell 1 with regard to the undercuts 11 and 22 enduringly reduces the forces acting on the screws 25 in the event of a crash. Additionally, the undercuts 11, 22 define a stop to ensure a simple alignment of the battery module 2 in the bodyshell 1 during assembly of the vehicle.

What is claimed is:

1. A motor vehicle, comprising:
a bodyshell having a rear region in proximity to a rear end of the vehicle, an upwardly open battery box in the rear region of the bodyshell, left and right front brackets at opposite left and right sides of the battery box, the left and right front brackets each formed with a vertically oriented wall to define at least one rearward facing first undercuts in proximity to the battery box and a receiving surface substantially normal to the vertically oriented wall, and first attachment holes extending through the receiving surface;
a battery module having a battery disposed in the battery box and a support connected fixedly to the battery and projecting beyond the battery, the support having opposite upper and lower surfaces and at least one projection extending from the lower surface, the at least one projection having a vertically oriented wall to define at least one second undercut on the support and contacting the first undercut, and second attachment holes formed in the support and registered with the first attachment holes when the second undercut contacts the first undercut; and
attachment members securing the battery module to the bodyshell at the registered attachment holes.

2. The motor vehicle of claim 1, wherein the battery is a high voltage battery.

3. The motor vehicle of claim 1, wherein the battery is arranged in a transverse direction of the motor vehicle.

4. The motor vehicle of claim 1, wherein the bodyshell has left and right rear longitudinal members on respective sides of the motor vehicle and the left and right front brackets are fixedly connected to each of the longitudinal members.

5. The motor vehicle of claim 4, wherein each bracket is a forged or cast part.

6. The motor vehicle of claim 4, wherein the support is made of steel.

7. The motor vehicle of claim 4, wherein the support has two screwing points to the bodyshell on each side of the battery.

8. The motor vehicle of claim 7, wherein the support has holes for receiving screws, and the bodyshell has holes or threaded bores for the screws.

9. The motor vehicle of claim 4, wherein the front and rear brackets on each of the longitudinal members form a constructional unit that has a front and a rear rest for the support.

10. The motor vehicle of claim 4, wherein the first undercut is formed on a rear side of the front bracket and interacts with the second undercut on the support.

11. The motor vehicle of claim 1, further comprising left and right rear brackets rearward of the respective left and right front brackets and formed with rear first attachment holes therein, the support of the battery module having rear second attachment holes that register with the rear first attachment holes when the second undercut contacts the first undercut.

12. The motor vehicle of claim 11, wherein the left rear bracket is unitary with the left front bracket and the right rear bracket is unitary with the right front bracket.

13. The motor vehicle of claim 1, wherein the battery rests on a base of the battery box and the support secured on an upper side of the battery and rests on the receiving surface.

* * * * *